Dec. 28, 1965
J. L. VERSTER ETAL
GAS-FILLED RADIATION DETECTOR WITH
CONTROLLED DENSITY OF GAS FILLING
Filed April 17, 1963
3,226,550
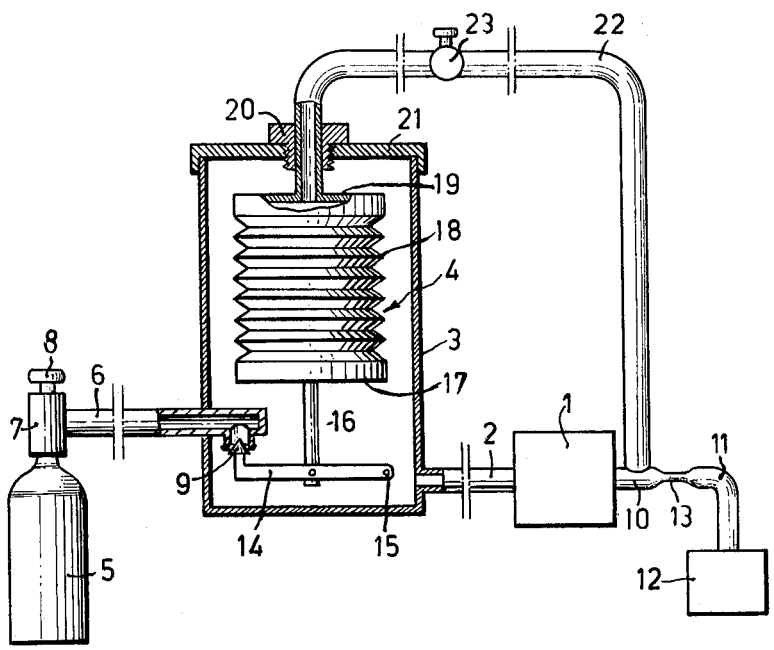
INVENTORS
JAN LOUIS VERSTER
SJOERD WYTZES
BY
AGENT

United States Patent Office

3,226,550
Patented Dec. 28, 1965

3,226,550
GAS-FILLED RADIATION DETECTOR WITH CONTROLLED DENSITY OF GAS FILLING
Jan Louis Verster and Sjoerd Wytzes, Emmasingel, Eindhoven, Netherlands, assignors to North American Philips Company Inc., New York, N.Y., a corporation of Delaware
Filed Apr. 17, 1963, Ser. No. 273,787
Claims priority, application Netherlands, Apr. 19, 1962, 277,472
5 Claims. (Cl. 250—83.6)

The invention relates to an apparatus for measuring X-ray and other ionizing radiation with the aid of a gas-filled measuring chamber in which ionisation of the gas produces discharges of avalanche character, an ionisable gas being passed through the chamber in automatically controlled amounts. In known arrangements of this kind the gas supply is effected by means of a space, for example, a gas cylinder, which is filled with gas at a pressure higher than that required in the measuring chamber. The measuring chamber has an outlet aperture which offers a predetermined resistance to flow, and by controlling the amount of gas supplied to the chamber the pressure in the chamber can be adjusted to a predetermined value.

It is known to use an automatic pressure regulator by which the gas supply is varied with variation of the pressure in the measuring chamber. Such regulation is of importance if the number and the amplitude of the electric pulses are used for measuring the radiation. Such a measuring chamber operates in the proportional range.

Pulse amplitude variations are due to variations in the value of the gas amplification and this depends upon the pressure of the gas. The use of an automatic pressure regulator has the object of reducing to a minimum the pressure differences which may occur in a gas-flow measuring chamber. In this process no allowance is made for temperature variations. It has been found that with a constant pressure the measurements are not independent of the temperature of the measuring chamber. It has been found that the gas amplification increases with increase of the absolute temperature, whereas it decreases with increase of the pressure. From this observation it has been concluded that, when the density of the gas filling of the measuring chamber is constant, the gas amplification remains the same or at least substantially the same.

It is an object of the invention to improve the known apparatus and to maintain the density of the gas filling in the measuring chamber constant irrespective of the temperature. According to the invention the position of the regulating member is determined by the pressure difference between the pressure of the gas in the measuring chamber and an oppositely operative pressure of an amount of gas which is contained in a closed space and has the same temperature as the measuring chamber. The regulating member may be a movable valve which opens an aperture for the passage of gas to the measuring chamber to a greater or lesser extent, and a practical embodiment of the apparatus in accordance with the invention is obtained by connecting the regulating valve to a flexible wall which separates the enclosed amount of gas from a space which communicates with the measuring chamber, the said wall flexing on variation of the pressure of the enclosed gas so as to alter the position of the regulating valve and the gas supply. On passing from a given temperature at which there is equilibrium between the pressures on both sides of the partition to another temperature, a state of equilibrium is again established at a slightly changed pressure due to an alteration of the passage of gas.

In order that the invention may readily be carried into effect, an embodiment thereof will now be described, by way of example, with reference to the accompanying drawing, which is a diagrammatic representation of an apparatus in accordance with the invention.

Referring now to the figure, a measuring chamber 1 is connected to a housing 3 of a pressure regulator 4 by a duct 2. The housing 3 is also connected by a duct 6 and a reduction valve 7 to a gas cylinder 5. The valve 7 can be closed and opened and the pressure of the issuing gas can be adjusted by means of a knob 8. The said pressure is chosen slightly higher than the pressure which is desired in the measuring chamber. The pressure regulator 4 serves to adjust the latter pressure with the aid of a valve 9.

The measuring chamber 1 communicates through a gas discharge aperture 10 and a duct 11 with a space 12 in which a low pressure is maintained, for example, a vacuum pump. There has to be a resistance to flow in the discharge duct to maintain the required pressure difference between the measuring chamber and the outlet. This resistance is represented by a constriction 13 of the discharge duct 11.

It is assumed that the pressure in the housing 3 of the regulator 4 is equal to the pressure in the measuring chamber 1. The latter two parts of the apparatus must be spaced comparatively closely. Excessive spacing between the pressure regulator 4 and the measuring chamber 1 may result in their assuming different temperatures. In this event the regulation for maintaining the density of the gas constant, which is the object of the invention, would not be effected.

The said regulation is obtained by influencing the flow of gas by means of the valve 9. An arm 14 of this valve is hinged about a pivot point 15. A pull rod 16 which is secured to the bottom 17 of an expansion vessel is hinged to the arm 14 between the point 15 and the valve 9. The expansion vessel 4 is a hermetically sealed gas-filled space having a flexible wall 18. When there is a difference in pressure between the interior of the vessel and the ambient atmosphere, the wall slightly changes shape with the result that the bottom 17 is displaced to an extent which is very slight for satisfactory regulation. This displacement moves the valve 9 which alters the aperture for the gas supply, the aperture being enlarged with a rise in temperature and reversely.

If, for example, the temperature rises, the pressure in the vessel 4 increases and the valve is opened further because the vessel 4 expands. The supply of gas to the measuring chamber 1 is increased and produces an increase in the pressure because the flow of gas meets more resistance in the constriction 13. The pressure in the space 3 increases until the pressure of the gas in the vessel 4 has been reached. When the temperature of the measuring chamber 1 and that of the expansion vessel 4 are equal, the density of the gas in the measuring chamber is equal to the density of the gas in the vessel 4. By designing the expansion vessel 4 so that its volume is only slightly changed by the expansion it can be ensured that the density of the gas contained in the vessel 4 remains substantially constant.

This regulation prevents variations in the temperature of the measuring chamber from altering the gas amplification. Hence reproducible indications are obtainable irrespective of the temperature and of any temperature variations. Furthermore the density of the gas in the measuring chamber 1 is not changed by variations of the atmospheric pressure. A cover 19 of the wall 18 of the expansion vessel 4 is connected by a set screw 20 to the cap 21 of the housing 3. By turning the set screw 20 so as to change the lift of the valve 9 the pressure in the measuring chamber 1 can be manually set to a given value.

The regulation for constant density most satisfactorily fulfills its object if the difference in pressure between the expansion vessel 4 and the measuring chamber 1 are reduced to a minimum. The possibility of equalitzing the said two pressures when the measuring apparatus is put into operation, is provided by a duct 22 connecting the vessel 4 to the gas outlet aperture 10 of the measuring chamber 1. When the cock 23 is opened, the pressure in the expansion vessel is equal to that in the measuring chamber. On commencement of the measurements, that is to say, when the measuring apparatus is ready for operation, the cock 23 is closed.

What is claimed is:

1. Apparatus for measuring ionizing radiation comprising a radiation-sensitive gas-filled measuring chamber having inlet and outlet apertures one of which has a constant cross-sectional area for flowing a gas through the measuring chamber, an adjustable regulating member for varying the cross-section of the other aperture, an enclosure containing a quantity of the same gas flowing through and which is at substantially the same temperature as the gas-filling of the measuring chamber, and means coupling the enclosure to the adjustable regulating member and responsive to a pressure difference between the gas-filling of the enclosure and the gas-filling of the measuring chamber for automatically adjusting the regulating member in response to variations in temperature of the gas in the enclosure whereby the rate of gas flow through the measuring chamber is altered and the density of the gas in the measuring chamber remains constant.

2. Apparatus for measuring ionizing radiation comprising a radiation-sensitive gas-filled measuring chamber having inlet and outlet apertures one of which has a constant cross-sectional area for flowing a gas through the measuring chamber, an adjustable regulating member for varying the cross-section of the other aperture, a housing through which a gas flows between said aperture of variable cross-section and said measuring chamber, a flexible wall within said housing defining an enclosure containing a quantity of the same gas flowing through and which is at the same temperature as the gas-filling of the measuring chamber, and means within the housing coupling said flexible wall to the adjustable regulating member responsive to a pressure difference between the gas-filling of the enclosure and the gas-filling of the measuring chamber for automatically adjusting the regulating member in response to variations in temperature of the gas in the enclosure whereby the rate of gas flow through the measuring chamber is altered and the density of the gas in the measuring chamber remains constant.

3. Apparatus for measuring ionizing radiation comprising a radiation-sensitive gas-filled measuring chamber having inlet and outlet apertures one of which has a constant cross-sectional area for flowing a gas through the measuring chamber, an adjustable regulating member for varying the cross-section of the other aperture, a housing through which a gas flows between said latter aperture and said measuring chamber, a flexible wall within said housing defining an enclosure containing a quantity of the same gas flowing through and which is at the same temperature as the gas-filling of the measuring chamber, means within the housing coupling said flexible wall to the adjustable regulating member responsive to a pressure difference between the gas-filling of the enclosure and the gas-filling of the measuring chamber for automatically adjusting the regulating member in response to variations in temperature of the gas in the enclosure whereby the rate of gas flow through the measuring chamber is altered and the density of the gas in the measuring chamber remains constant, and means adjustably positioning the flexible wall within the housing to thereby adjustably position the initial position of the regulating member and the initial flow of gas into the measuring chamber.

4. Apparatus for measuring ionizing radiation comprising a radiation-sensitive gas-filled measuring chamber having inlet and outlet apertures one of which has a constant cross-sectional area for flowing a gas through the measuring chamber, an adjustable regulating member for varying the cross-section of the other aperture, a housing through which a gas flows between said latter aperture and said measuring chamber, a flexible wall within said housing defining an enclosure containing a quantity of the same gas flowing through and which is at the same temperature as the gas-filling of the measuring chamber, conduit means connecting said enclosure with said aperture of constant cross-sectional area to introduce the quantity of gas into said enclosure, means to control the gas flow through said conduit, and means within the housing coupling said flexible wall to the adjustable regulating member responsive to a pressure difference between the gas-filling of the enclosure and the gas-filling of the measuring chamber for automatically adjusting the regulating member in response to variations in temperature of the gas in the enclosure whereby the rate of gas flow through the measuring chamber is altered and the density of the gas in the measuring chamber remains constant.

5. Apparatus for measuring ionizing radiation comprising a radiation-sensitive gas-filled measuring chamber having inlet and outlet apertures one of which has a constant cross-sectional area for flowing a gas through the measuring chamber, an adjustable regulating member for varying the cross-section of the other aperture, a housing through which a gas flows between said latter aperture and said measuring chamber, a flexible wall within said housing defining an enclosure containing a quantity of the same gas flowing through and which is at the same temperature as the gas-filling of the measuring chamber, conduit means connecting said enclosure with said aperture of constant cross-sectional area to introduce the quantity of gas into said enclosure, valve means to control the gas flow to said enclosure, means within the housing coupling said flexible wall to the adjustable regulating member responsive to a pressure difference between the gas-filling of the enclosure and the gas-filling of the measuring chamber for automatically adjusting the regulating member in response to variations in temperature in the enclosure whereby the rate of gas flow through the measuring chamber is altered and the density of the gas in the measuring chamber remains constant, and means adjustably positioning the flexible wall within the housing and thereby adjustably positioning the initial position of the regulating member and the initial flow of gas into the measuring chamber.

References Cited by the Examiner

UNITED STATES PATENTS

| | | | |
|---|---|---|---|
| 2,837,656 | 6/1958 | Hendee | 250—83.6 |
| 2,916,047 | 12/1959 | Butcher | 137—501 |
| 2,924,715 | 2/1960 | Hendee | 250—83.6 |
| 3,114,042 | 12/1963 | Christianson | 250—83.6 |

RALPH G. NILSON, *Primary Examiner.*

JAMES W. LAWRENCE, *Examiner.*